May 5, 1936. H. B. BRYAN ET AL 2,039,281
FILTER
Filed April 24, 1935 3 Sheets-Sheet 1
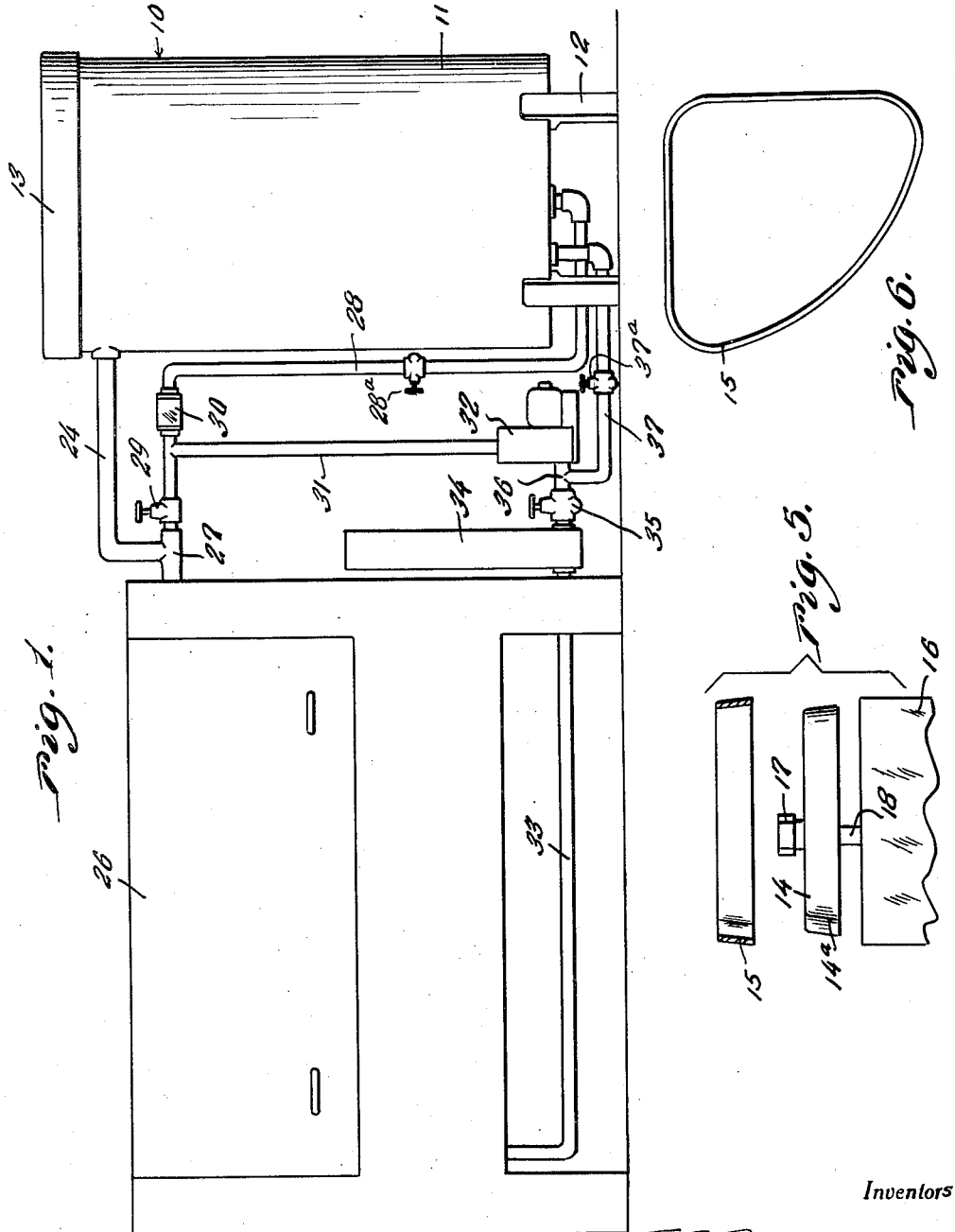
Inventors
H. B. Bryan
A. D. Copehart
By Clarence A. O'Brien
Attorney

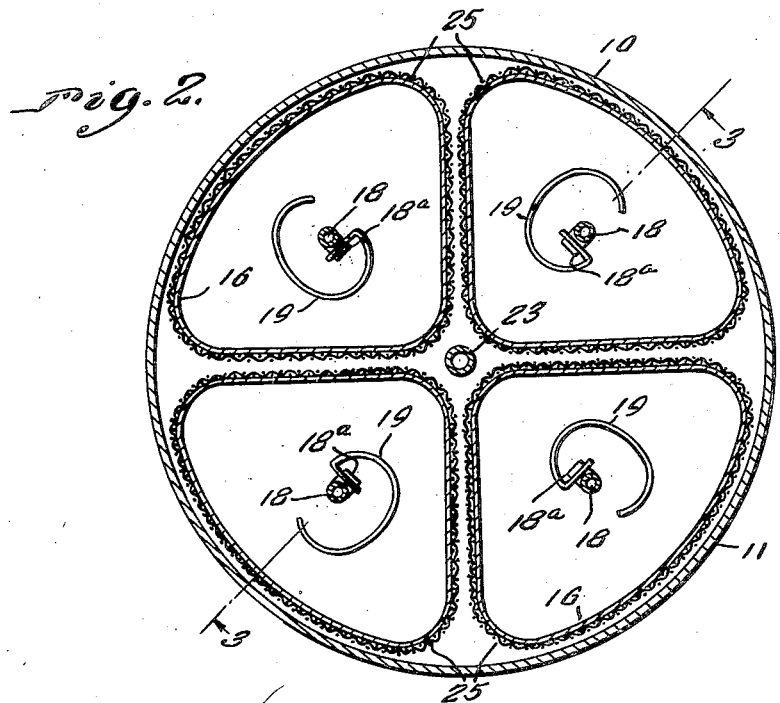
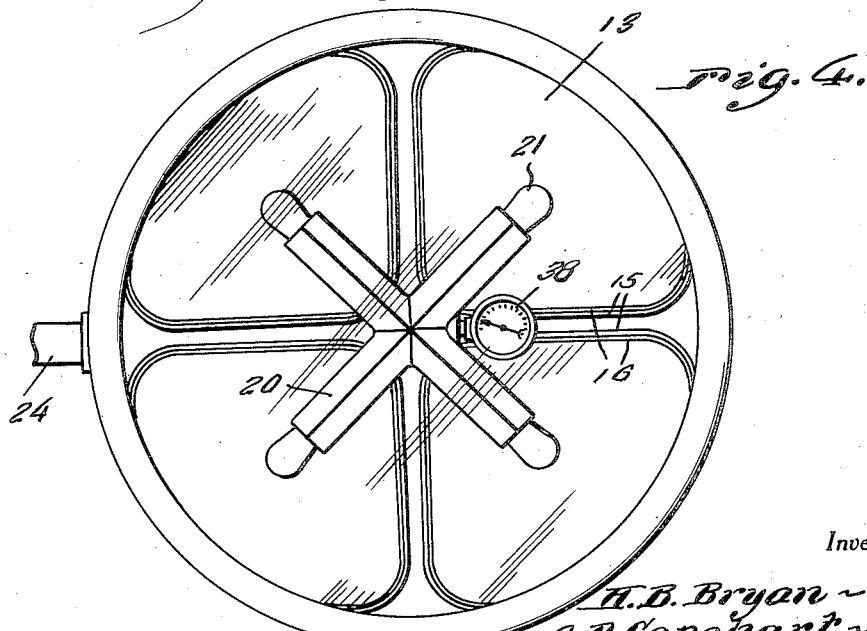

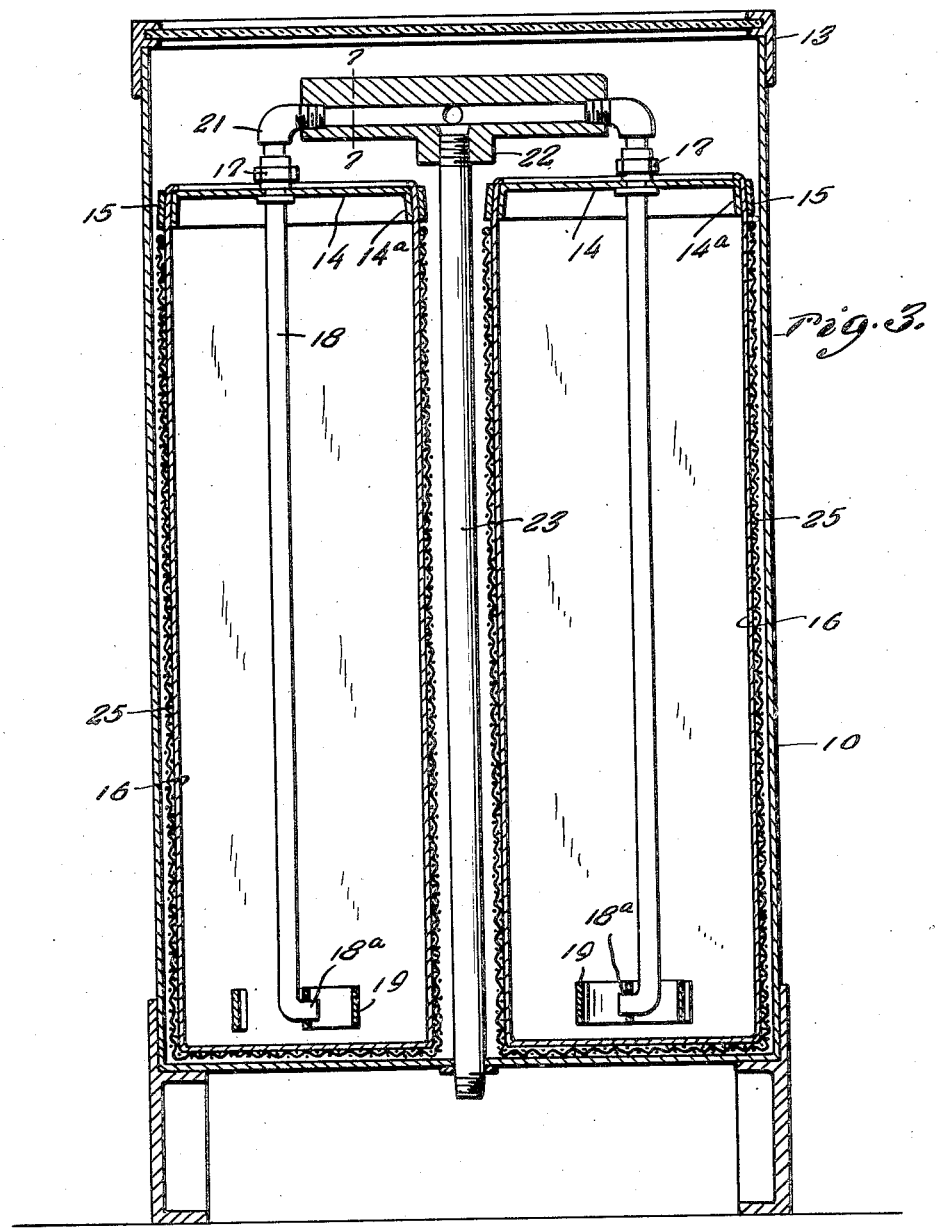

Patented May 5, 1936

2,039,281

UNITED STATES PATENT OFFICE 2,039,281

FILTER

Henry B. Bryan and Ashbourne D. Capehart,
Oxford, N. C.

Application April 24, 1935, Serial No. 18,067

2 Claims. (Cl. 210—178)

This invention relates to filtering devices and is more particularly concerned with filtering devices of the type used in connection with washers used in cleaning plants.

Among the objects of the present invention are to provide a filter characterized by economy and simplicity of structure, efficiency of operation, and also to provide a filter which will have such an arrangement of parts that the same are easily accessible.

The invention together with its objects and advantages will be best understood from a study of the following description taken in connection with the accompanying drawings wherein:

Figure 1 is an elevational view illustrating the application of the invention.

Figure 2 is a transverse sectional view through the filter.

Figure 3 is a vertical sectional view taken substantially on the line 3—3 of Figure 2.

Figure 4 is a top plan view of the filter.

Figure 5 is an elevational view of a filter bag, head plate, and clamping band, the parts referred to being shown separated.

Figure 6 is a plan view of a clamping band.

Figure 7 is a sectional view through an arm or branch of a manifold forming part of the invention, and taken substantially on line 7—7 of Figure 3.

Referring to the drawings by reference numerals it will be seen that the improved filter indicated generally by the reference numeral 10 comprises a cylinder or drum 11 mounted on legs or other suitable supporting means 12. For the top of the drum 11 there is provided a glass or transparent lid or closure 13 that fits down over the drum in telescopic relation as suggested in Figure 1.

The drum 11 is of a size to accommodate, in the present instance four filtering elements, each of which includes a head plate 14 which is substantially of segmental shape in plan and is provided with a downturned flange 14a the outer face of which is inclined so as to cooperate with a retaining band 15 whose inner face is also inclined and which fits down over the head 14 in a manner to clamp to the plate 14 the edge of a filtering bag 16 at the open top or mouth of said bag. The bag 16 may be formed of any suitable material, such as canvas, ticking, etc.

The head 14 is provided at about its center with a nipple 17 with which is engaged by threads or in any other suitable manner an elongated pipe 18 that extends downwardly through the bag 16 to terminate adjacent the bottom of the bag in a laterally directed discharge 18a. (See Figure 3.) At the discharge end 18a thereof, there is secured to the pipe a substantially G-shaped baffle member 19 so disposed relative to the discharge 18a as to cause a whirling motion of the solvent as it issues from the pipe 18.

There is also provided a substantially cruciform distributor 20 in the present instance, being four branches of a cross section suggested in Figure 7 there being one branch for each pipe 18. Each branch of the manifold 20 is connected with its nipple 17 by a union and elbow as indicated generally at 21 in Figure 3.

As also shown in Figure 3 the manifold 20 at its center and on its bottom side is provided with a threaded inlet 22 into which is threaded one end of a feed pipe 23 that extends downwardly at about the center of the drum 11 and at its lower end extends through the bottom of the drum as shown in Figure 3.

It will thus be seen that a solvent flowing upwardly through the pipe 23 will be distributed by the manifold 20 to flow through the pipes 18 of the filtering elements which solvent will filter through the bags 16 and will return to the washer from the drum 11 through a return pipe 24.

For each filtering element there is also provided a casing 25 of screen or reticulated material into which conformably fits the bag 16 as also best shown in Figure 3. In this connection it will be understood that screen casing 25 will serve to maintain the shape of the bag 16 and to prevent bursting of the bag as might occur due to the pressure internally of the bag.

In use, the filter is placed near the washer 26 as shown in Figure 1 and the outlet 27 of the washer is connected with the pipe 24 and also through the medium of pipe 28 with the pipe 23. In the piping 28 there are provided valves 28a, 29 and a sight glass 30. From the piping 28 at a point between the valve 29 and the sight glass 30 there leads a branch 31 to a suitable motor driven pump 32.

Other connections between the filter 10 and the washer 26 are provided through the medium of the usual pipe 33, trap 34, valve 35, pipe 36 connected with the pump 32, and pipe 37 leading directly from the pipe 36 at one side of the valve 35 to the drum 11 of the filter. A valve 37a is arranged in pipe 37.

From the above it will be apparent that in actual practice the pump 32, with the valves 29 and 37a closed and valve 35 open draws the solvent from the washer 26 through pipe 33, trap 34 and valve 35 and forces the solvent through the piping 31, glass 30, pipe 28, valve 28a and pipe 23 to the head 20 where it is distributed through the branches of the manifold 20 to the several filtering elements, the fluid being directed toward the bottoms of the filtering elements by the pipes 18 and discharging into the filtering bags at the ends 18a of the pipes. As previously explained the baffles 19 will cause a whirling movement of the solvent with each bag 16 as it discharges into the filtering bag 16. The solvent is thus forced through the bags 16 and screens 25 into the drum 11. The filtered solvent as it reaches a level in the drum 11 passes from the drum through the pipe 24 back into the washer 26, clear of all foreign matter.

With a filtering device of this character it will be apparent that the bags 16 are easily accessible, can be readily removed, replaced with clean bags, and used bags after being dried and shaken are placed in the washer 26 to be cleaned for subsequent use.

Completing the equipment, a pressure gauge is suitably provided so as to be readily seen through the lid 13 as shown in Figure 4.

It will also be noted that when it is desired to drain the filter, valves 29 and 37a are open while valves 28a and 35 are closed so that the solvent from the washer is forced through the pipes 37, 36 and 32, passing upwardly and through pipe 31 and into the washer 26 through the valve 29 and connection 27, thus draining all fluid from drum 10 so that soiled bags 16 may be removed without waste of solvent.

Through the medium of the sight glass 30 one may readily ascertain how well filtered the solvent is, as will be readily appreciated.

Having thus described the invention, what is claimed as new is:

1. In a filtering device of the character described, a filtering element comprising a head plate, a filtering bag adapted to receive said head plate in the open end of the bag, a clamping ring embracing said head plate and cooperable with the periphery of the plate for clamping the head of the bag to said plate, a conductor pipe for the fluid to be filtered extending downwardly from said head and terminating in a lateral discharge, and a substantially G-shaped baffle member secured at one end to the lateral discharge of said pipe.

2. A filtering device of the character described comprising a drum having a feed pipe for the material to be filtered extending vertically upwardly from the bottom of the drum at the center thereof, a manifold on the upper end of said feed pipe having a plurality of branches, a filtering element connected with said manifold, overflow means connected with the drum for carrying off the filtered material, each filtering element including a head plate, a filtering bag, means for attaching the open end of the bag to the head plate, a pipe connected with a branch of the manifold and extending downwardly to terminate adjacent the bottom of said bag for directing the material to be filtered into said bag the free open end of said pipe being bent laterally, and a G-shaped baffle member on the lower laterally disposed end of said pipe and disposed substantially concentric to said pipe and in position relative to the discharge end of the pipe to cause a whirling action of the liquid discharging from said pipe.

HENRY B. BRYAN.
ASHBOURNE D. CAPEHART.